(12) United States Patent
Goldenberg et al.

(10) Patent No.: US 9,003,287 B2
(45) Date of Patent: Apr. 7, 2015

(54) INTERACTION BETWEEN 3D ANIMATION AND CORRESPONDING SCRIPT

(75) Inventors: Joshua Goldenberg, Emeryville, CA (US); Louise Rasmussen, Fairfax, CA (US); Adam Schnitzer, Petaluma, CA (US); Domenico Porcino, San Rafael, CA (US); George Lucas, San Francisco, CA (US); Brett A. Allen, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 628 days.

(21) Appl. No.: 13/299,518

(22) Filed: Nov. 18, 2011

(65) Prior Publication Data

US 2013/0132835 A1   May 23, 2013

(51) Int. Cl.
*G06F 3/00*  (2006.01)
*G11B 27/34*  (2006.01)
(Continued)

(52) U.S. Cl.
CPC .............. *G11B 27/34* (2013.01); *G11B 27/036* (2013.01); *G06T 13/20* (2013.01); *G06T 2200/24* (2013.01); *G06T 2213/04* (2013.01)

(58) Field of Classification Search
USPC ......... 715/716, 719, 720, 721, 722, 723, 726, 715/753, 757, 758, 759, 764, 781, 782, 848, 715/852; 717/134, 135, 138; 345/473, 474, 345/475, 676, 664, 653, 419
See application file for complete search history.

(56) References Cited

U.S. PATENT DOCUMENTS 5,148,154 A * 9/1992 MacKay et al. ............... 715/782
5,307,456 A * 4/1994 MacKay ........................ 715/782
5,404,316 A * 4/1995 Klingler et al. ............... 715/723
(Continued)

FOREIGN PATENT DOCUMENTS

WO  WO 2010/045735 A1   4/2010
WO  WO 2010/118528 A1   10/2010

OTHER PUBLICATIONS

Notification of Transmittal of The International Search Report and The Written Opinion of the International Searching Authority, or The Declaration; International Search Report and Written Opinion of The International Searching Authority for corresponding International Application No. PCT/US2012/065625 mailed on Aug. 2, 2013, 16 pages.

(Continued)

*Primary Examiner* — Weilun Lo
*Assistant Examiner* — Rashedul Hassan
(74) *Attorney, Agent, or Firm* — Kilpatrick Townsend & Stockton LLP (57) ABSTRACT

Interaction between a 3D animation and a corresponding script includes: displaying a user interface that includes at least a 3D animation area and a script area, the 3D animation area including (i) a 3D view area for creating and playing a 3D animation and (ii) a timeline area for visualizing actions by one or more 3D animation characters, the script area comprising one or more objects representing lines from a script having one or more script characters; receiving a first user input corresponding to a user selecting at least one of the objects from the script area for assignment to a location in the timeline area; generating a timeline object at the location in response to the first user input, the timeline object corresponding to the selected object; and associating audio data with the generated timeline object, the audio data corresponding to a line represented by the selected object.

23 Claims, 10 Drawing Sheets (51) Int. Cl.
*G11B 27/036* (2006.01)
*G06T 13/20* (2011.01)

(56) References Cited

U.S. PATENT DOCUMENTS

| | | | |
|---|---|---|---|
| 5,553,221 A * | 9/1996 | Reimer et al. | 715/720 |
| 5,781,188 A * | 7/1998 | Amiot et al. | 715/723 |
| 5,801,685 A * | 9/1998 | Miller et al. | 715/202 |
| 6,404,978 B1 * | 6/2002 | Abe | 386/281 |
| 6,686,918 B1 * | 2/2004 | Cajolet et al. | 345/473 |
| 7,325,199 B1 * | 1/2008 | Reid | 715/723 |
| 7,818,658 B2 * | 10/2010 | Chen | 715/201 |
| 8,006,189 B2 * | 8/2011 | Dachs | 715/751 |
| 8,271,962 B2 * | 9/2012 | Muller | 717/135 |
| 8,341,525 B1 * | 12/2012 | Achour et al. | 715/716 |
| 8,443,284 B2 * | 5/2013 | Lindley et al. | 715/704 |
| 2001/0036356 A1 * | 11/2001 | Weaver et al. | 386/52 |
| 2002/0037153 A1 * | 3/2002 | Slone | 386/52 |
| 2003/0001880 A1 * | 1/2003 | Holtz et al. | 345/716 |
| 2003/0018609 A1 * | 1/2003 | Phillips et al. | 707/1 |
| 2003/0086686 A1 * | 5/2003 | Matsui et al. | 386/52 |
| 2004/0008220 A1 * | 1/2004 | Snyder et al. | 345/716 |
| 2004/0117730 A1 * | 6/2004 | Ibrahim et al. | 715/500.1 |
| 2004/0125124 A1 * | 7/2004 | Kim et al. | 345/716 |
| 2005/0235198 A1 * | 10/2005 | Howard et al. | 715/500.1 |
| 2006/0277454 A1 * | 12/2006 | Chen | 715/500.1 |
| 2006/0282776 A1 | 12/2006 | Farmer et al. | |
| 2007/0061728 A1 * | 3/2007 | Sitomer et al. | 715/723 |
| 2007/0156625 A1 * | 7/2007 | Visel | 706/62 |
| 2007/0174774 A1 * | 7/2007 | Lerman et al. | 715/723 |
| 2008/0129865 A1 * | 6/2008 | Leonard | 348/468 |
| 2008/0170077 A1 | 7/2008 | Sullivan et al. | |
| 2008/0178087 A1 * | 7/2008 | Fitzgibbon et al. | 715/723 |
| 2008/0300053 A1 * | 12/2008 | Muller | 463/31 |
| 2008/0307304 A1 | 12/2008 | Feiler et al. | |
| 2009/0046097 A1 * | 2/2009 | Franklin | 345/419 |
| 2009/0219291 A1 * | 9/2009 | Lloyd et al. | 345/427 |
| 2010/0122193 A1 | 5/2010 | Lange et al. | |
| 2010/0281383 A1 * | 11/2010 | Meaney et al. | 715/723 |
| 2010/0332225 A1 | 12/2010 | Arrowood et al. | |
| 2011/0113315 A1 | 5/2011 | Datha et al. | |
| 2011/0113316 A1 | 5/2011 | Datha et al. | |
| 2011/0113348 A1 * | 5/2011 | Twiss et al. | 715/753 |
| 2012/0089920 A1 * | 4/2012 | Eick | 715/739 |

OTHER PUBLICATIONS

Leavitt, "Script-based editing: First Impressions", Aug. 11, 2009, downloaded from the internet at http://viewfromthecuttingroomfloor.wordpress.com/2009/08/11/script-based-editing/ on May 20, 2011, 5 pages.

Peters, "Avid ScriptSync—Automating Script Based Editing", Jun. 8, 2008, downloaded from the internet at http://web.archive.org/web/20101031045315/http://digitalfilms.wordpress.com/2008/06/08/avid-scriptsync-%E2%80%93-automating-script-based-editing/ on Feb. 1, 2012, 5 pages.

Ronfard, et al. "A Framework for Aligning and Indexing Movies with their Scripts", ICME '03 Proceedings of the 2003 International Conference on Multimedia and Expo—vol. 2, Jul. 2003, 4 pages.

Wikipedia, "Machinima", Nov. 6, 2010, downloaded from the internet at http://web.archive.org/web/20101109173743/http://en.wikipedia.org/wiki/Machinima on Feb. 6, 2012, 10 pages.

International Preliminary Report on Patentability and Written Opinion dated May 20, 2014 for International Application No. PCT/US2012/065625, 11 pages.

* cited by examiner

FIG. 5

INTERACTION BETWEEN 3D ANIMATION AND CORRESPONDING SCRIPT

TECHNICAL FIELD

This document relates to interaction between a 3D animation program and a corresponding script in a movie script program.

BACKGROUND

Among the team of people who collaborate when a motion picture or other video recording is being created, the film director is the person ultimately in charge of artistic and creative decisions. Based on the movie script and other materials, a director generally develops in his or her mind a vision of what the finished movie should look like, for example of the impressions that various scenes are intended to give the audience. Before and during the moviemaking process the director communicates the vision both to the moviemaking team (e.g., to set designers and camerapersons), and to the actors.

Directors often use storyboards for such planning and communication. Generally, a storyboard is a sequence of sketches or photographs that illustrate portions of the intended artistic product. Storyboards have been created by hand and also electronically by computer.

The movie script or screenplay contains the dialogue lines to be spoken by various characters, and also typically scene or action instructions. Some computer programs exist for writing and editing scripts.

SUMMARY

In a first aspect, a computer-implemented method for interaction between a 3D animation and a corresponding script includes: displaying a user interface that includes at least a 3D animation area and a script area, the 3D animation area including (i) a 3D view area for creating and playing a 3D animation and (ii) a timeline area for visualizing actions by one or more 3D animation characters, the script area comprising one or more objects representing lines from a script having one or more script characters; receiving a first user input corresponding to a user selecting at least one of the objects from the script area for assignment to a location in the timeline area; generating a timeline object at the location in response to the first user input, the timeline object corresponding to the selected object; and associating audio data with the generated timeline object, the audio data corresponding to a line represented by the selected object.

Implementations can include any or all of the following features. The user selects more than one of the objects in the script area, the selected objects having an order specified by the script, and the method further includes: generating timeline objects corresponding to the respective selected objects; and positioning the timeline objects in the timeline area according to the order. The first user input initially places the selected object in the 3D view area, and the method further includes: identifying the location in the timeline area as corresponding to a current state of the 3D view area; wherein the selected object is placed at the location in the timeline area based on the identification. The user hovers the selected object over the timeline area before the assignment, and wherein the location in the timeline area is determined based on where in the timeline area the user places the selected object. The line or lines represented by the selected object belong to a specific script character, and the method further includes: associating the specific script character with one of the 3D animation characters; and color coding, based on the association, the specific script character and the 3D animation character using a common color. The method further includes comparing a name of the 3D animation character with the specific script character, wherein the association is based on the comparison. The method further includes receiving a second user input that indicates the specific script character and a name of the 3D animation character, wherein the association is based on the second user input. The color coding is present at least: (i) in a script character list; and (ii) in a marking adjacent the selected object in the script area.

The method further includes updating, in response to the assignment of the selected object to the location in the timeline area, at least the script area to visually distinguish the selected object from any of the objects that have not been assigned to the timeline area. The timeline object shows (i) dialogue text corresponding to the line represented by the selected object, and (ii) an audio waveform corresponding to the audio data. The method further includes making a recording of the 3D animation, and updating at least the script area to include camera and take identifiers for the recording. The method further includes updating, in response to the recording, the script area with a linear mark indicating at least one of the lines as being included in the recording. The method further includes receiving a second user input upon the user selecting the camera identifier or the take identifier, and playing the recording in response to the second user input. The method further includes: generating an audio file by recording a reading of the line represented by the selected object; and associating the audio file with the object before the first user input is received, wherein the audio data is obtained from the audio file for association with the generated timeline object. Audio files have been generated for multiple ones of the lines, the method further comprising collating and exporting the audio files. The method further includes receiving a second user input after generating the timeline object, the second user input selecting one of the timeline object and the object from the script area; and highlighting, based on the second user input, the other of the timeline object and the object.

In a second aspect, a computer program product is tangibly embodied in a computer-readable storage medium and includes instructions that when executed by a processor perform a method for interaction between a 3D animation and a corresponding script. The method includes: displaying a user interface that includes at least a 3D animation area and a script area, the 3D animation area including (i) a 3D view area for creating and playing a 3D animation and (ii) a timeline area for visualizing actions by one or more 3D animation characters, the script area comprising one or more objects representing lines from a script having one or more script characters; receiving a first user input corresponding to a user selecting at least one of the objects from the script area for assignment to a location in the timeline area; generating a timeline object at the location in response to the first user input, the timeline object corresponding to the selected object; and associating audio data with the generated timeline object, the audio data corresponding to a line represented by the selected object.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for a movie script program to interact with a 3D animation program. Generally, the movie script program includes a list of script characters and a set of script lines spoken by the script characters. Examples are described herein of how a user can view and control script lines in relation to actions in the 3D animation program and vice versa. In this document, the term "script" generally refers to a script of dialogue or monologue for a movie, television program, play, performance, or any other form of artistic expression by one or more actors.

Figure 1A:
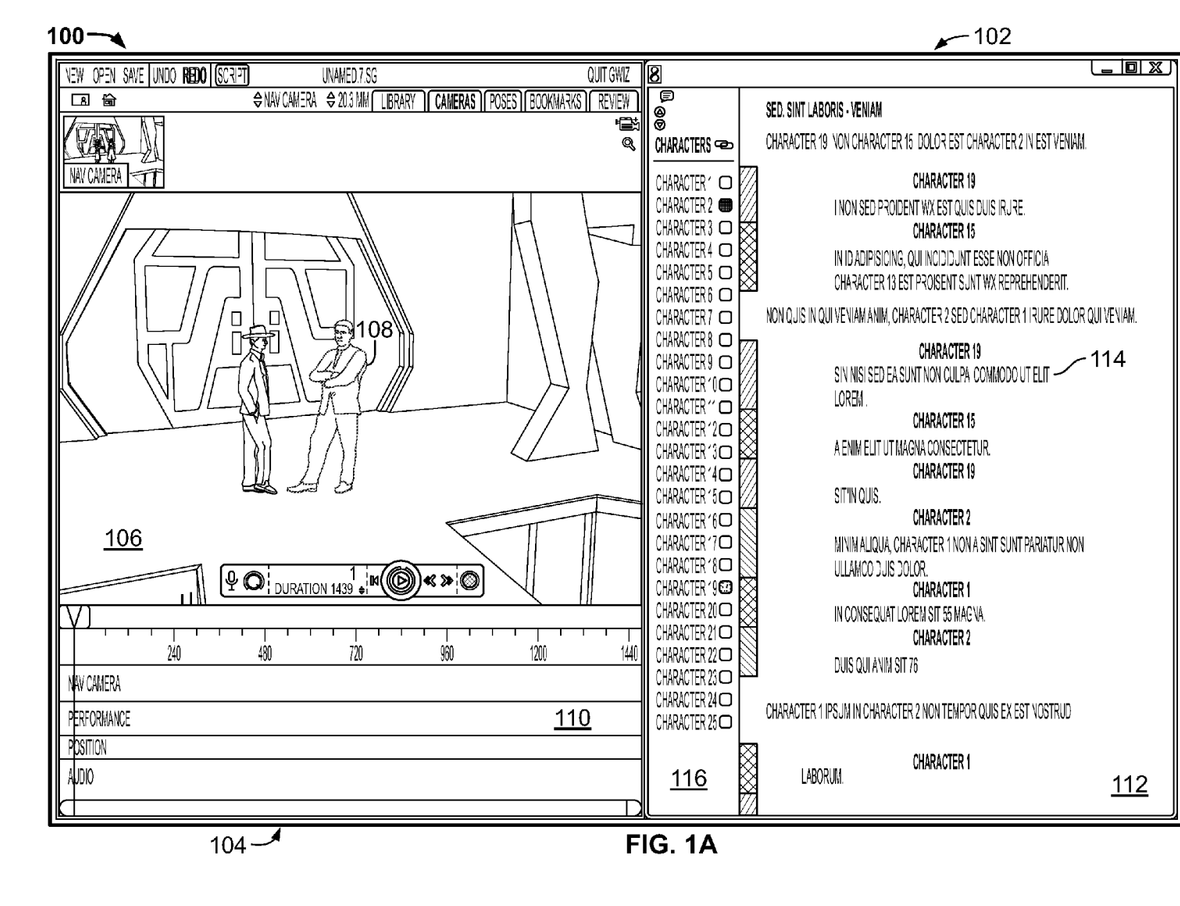
FIGS. 1A-E show examples of interaction between a 3D animation program and a movie script program.

FIGS. 1A-E show examples of interaction between a 3D animation program 100 and a movie script program 102. With reference first to FIG. 1A, a user interface 104 here presents output from the programs 100 and 102. A user can work with the 3D animation program 100 and/or the movie script program 102 as part of an artistic or creative process.

The 3D animation program 100 includes a 3D view area 106 that can show various virtual environments. The virtual environments can be designed to have any appearance, including, but not limited to: an indoor or outdoor location or surrounding; a building, vehicle or other structure; an underwater scene; a portion of outer space; or a fictitious place. The virtual environment can be implemented as code or any other computer-readable information that a computer system uses to render the 3D view area 106. For example, the virtual environment can be designed based on instructions from the director as to how the actual movie set is expected to look.

The 3D view area 106 can be designed based on a scene that occurs in the script. Particularly, the virtual environment can then resemble at least part of the set as it is intended to be staged in a studio or at a location. In such implementations, a director or other artist can use the 3D animation program 100 to create an animation sequence that shows a virtually generated performance of that scene. Such performance can include one or more 3D animation characters 108 playing roles from the script. The 3D animation program 100 thereby allows the director to evaluate whether the set will serve its intended purpose and/or to experiment with different camera angles, etc., before the filming begins. The virtual environment and animation characters shown in the figures are used for illustration purposes only.

The 3D animation program 100 also includes a timeline area 110 that visualizes actions by the 3D animation characters 108 or by other aspects of the program. For example, when a character moves in the set, the movement can be represented as one or more timeline objects visible in the timeline area 110. Similarly, one or more virtual cameras are defined in the 3D animation program for recording the animations, and such cameras' activities are represented by other timeline objects. While the 3D animation is running, the timeline area 110 can be traversed from left to right by a playhead or other visual indicator that represents the flow of time, and the timeline object then indicates, with reference to the playhead, the beginning, duration and end of the corresponding movement or action.

Turning now to the movie script program 102, the user begins by opening a script file that contains the corresponding movie script in electronic form. Any suitable file format can be used for the script file. For example, the movie script program 102 handles script files that are coded using XML or any other suitable markup language. When the script file is opened, the program generates a script area 112 in the user interface that presents the script and other related information. The script can be presented in the form of rendered HTML code or in any other suitable form of graphics. For purposes of illustration, the characters are here generically named "Character1" through "Character25", and the individual dialogue lines are represented by filler text.

The script includes lines of dialogue, organized in the order that they should be spoken, and also instructions regarding scenes and actions. Each line is associated with a script character, and the name of the character can be shown above the character's line(s) in the script. The script area 112 includes one or more objects 114, for example presenting at least one line of dialogue and the name of the corresponding character.

The movie script program 102 also presents a script character list 116 that is part of, or associated with, the script shown in the script area 112. The script character list 116 contains the names of the characters that appear in the script, and can be based on XML metadata from the script file, for example. The script character list 116 can be sorted or otherwise organized in any suitable way, for example alphabetically or by order of appearance in the script.

In the state that the 3D animation program 100 has in the example described above, the director may have created some or all of the 3D animation, including the movements of the 3D animation characters 108. Typically, such movements are created to match, or at least be consistent with, what is described in the script. For example, if the script instructs a script character to walk across the floor, the user can program the 3D animation so that one of the 3D animation characters 108 walks across a floor in the 3D animation area 106. Similarly, the director may have defined the positions and orientations of the virtual cameras, and may have specified the times during the 3D animation when each of the cameras should capture video.

The director now wishes to assign dialogue lines from the script to the 3D animation to form an essentially complete preview of the scene. That is, the director may wish to evaluate how the virtual set, the characters and their movements, the camera positions, and the spoken dialogue all fit together in the scene. With a virtual set that looks relatively realistic, and with good quality animation and dialogue speech, the director can get a very representative understanding of how the actual movie shot would look. This can be very useful and efficient because it allows the director to evaluate and adjust the planned scenes ahead of time.

Figure 1B:
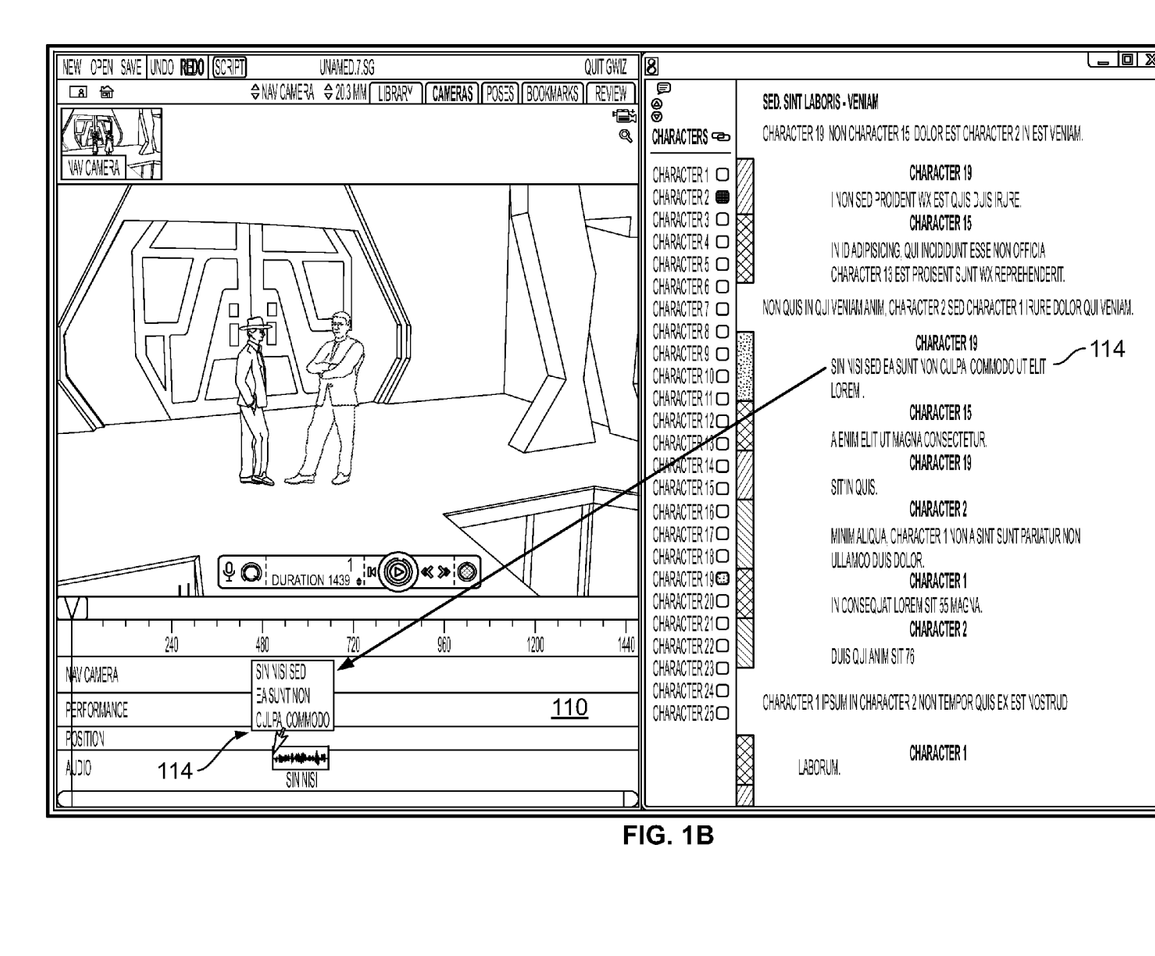

To assign a piece of dialogue from the script to the 3D animation, the director will allocate the script line to a particular place in the timeline 110. FIG. 1B shows an example of a user selecting the object 114 in the movie script program and dragging the object to the timeline area 110 in the 3D animation program. While being dragged (or otherwise moved on the screen) the object 114 can display at least some text from the corresponding line in the script. This confirms to the user that the dialogue line is the correct one, and can help the user decide on the correct position in the timeline. While being dragged, the object 114 can also or instead display an audio waveform corresponding to audio data associated with the dialogue line.

The user places the object 114 at a suitable location in the timeline, typically such that the dialogue line fits or is compatible with the situation appearing in the 3D view area. The act of registering a placement location for the object can be triggered in any suitable way, including, but not limited to: by the user releasing a physical button (e.g., on a stylus) that has been held during the dragging motion; by the user tapping one or more times with the tip of a stylus; or by the user pressing a particular virtual or physical button. The placement location is determined by where in the timeline the user places the object. For example, if the user hovers the dragged object over multiple time locations in the timeline before placing the object, then the placement location is defined as the current location of the object when the placement action occurs.

The object 114 is here shown in the timeline area 110 to illustrate the dragging action. However, the object 114 will not remain in the timeline area after being dropped there. Rather, it is located in the script area 112 also after being assigned to the timeline.

Figure 1C:
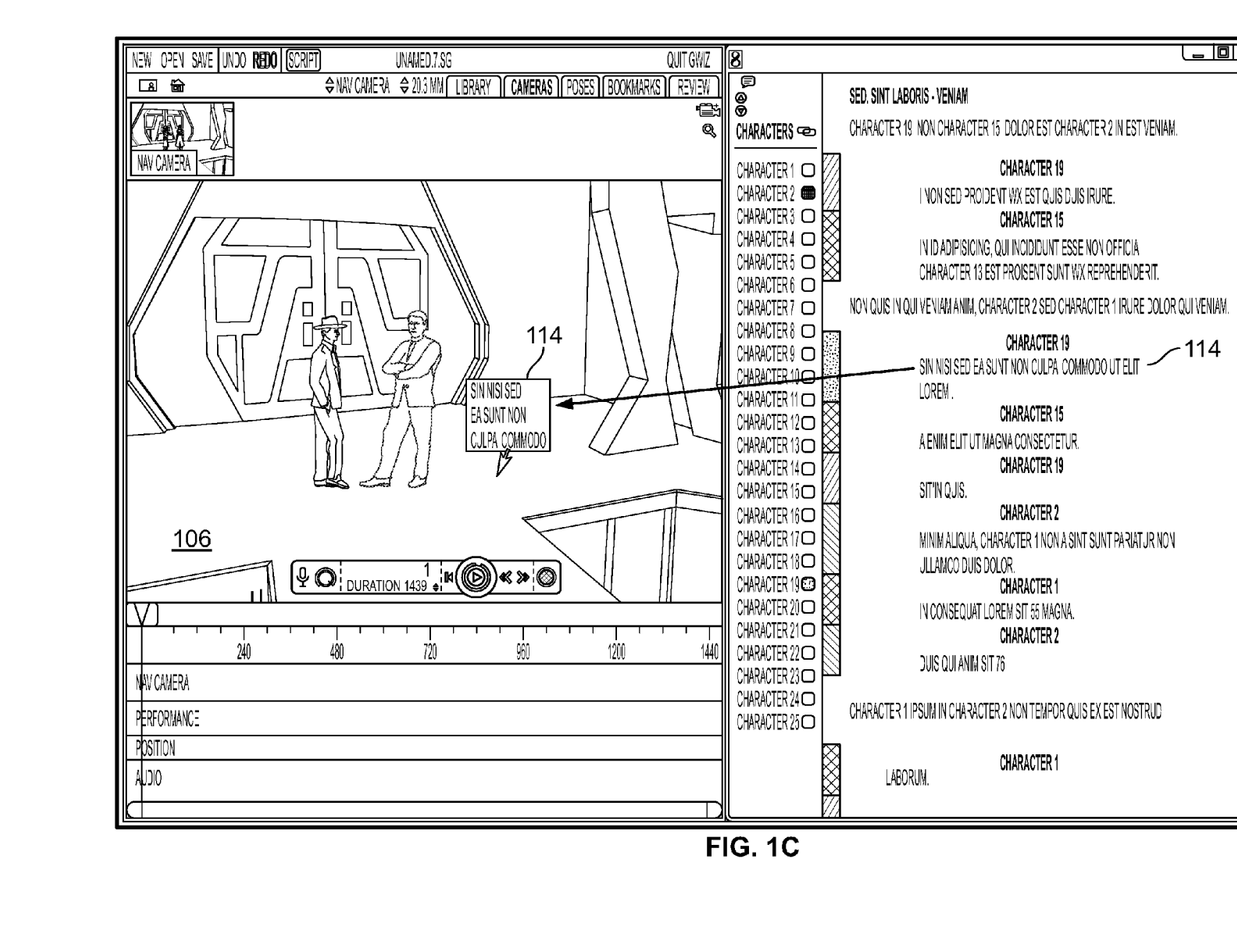

Other ways of assigning the object 114 to the timeline can be used. For example, FIG. 1C shows that the user selects the object 114 and instead drags (or otherwise moves) the object to the 3D animation area 106. That is, the 3D animation area 106 currently shows a representation of the animation characters, etc., in a state corresponding to a particular moment along the timeline of the animation. This moment can correspond to the playhead being in a particular location along the timeline; for example at the beginning of the timeline or at some later position. The user assigns the object 114 to the 3D animation area to allocate the script line to the position in time corresponding to the current state of the 3D animation area 106.

Similar to the above example, the object 114 here displays the beginning of the script line while the object is being dragged. When the placement action is triggered, the object 114 is registered as having been assigned to the corresponding moment in time.

Any suitable input device can be used in selecting and moving the object 114. In some implementations, a stylus or other pointing device can be used. Some implementations have a touchscreen interface that shows the output from the programs in whole or in part, and the user drags and places the object by touching the screen. The selection of the object can occur upon a particular user input, such as a click on the object, or the selection can happen intrinsically when the user begins dragging (or otherwise moving) the object.

The object 114 is here shown in the 3D animation area 106 to illustrate the dragging action. However, the object 114 will not remain in the 3D animation area 106 after being dropped there. Rather, it is located in the script area also after being assigned to the timeline.

Figure 1D:
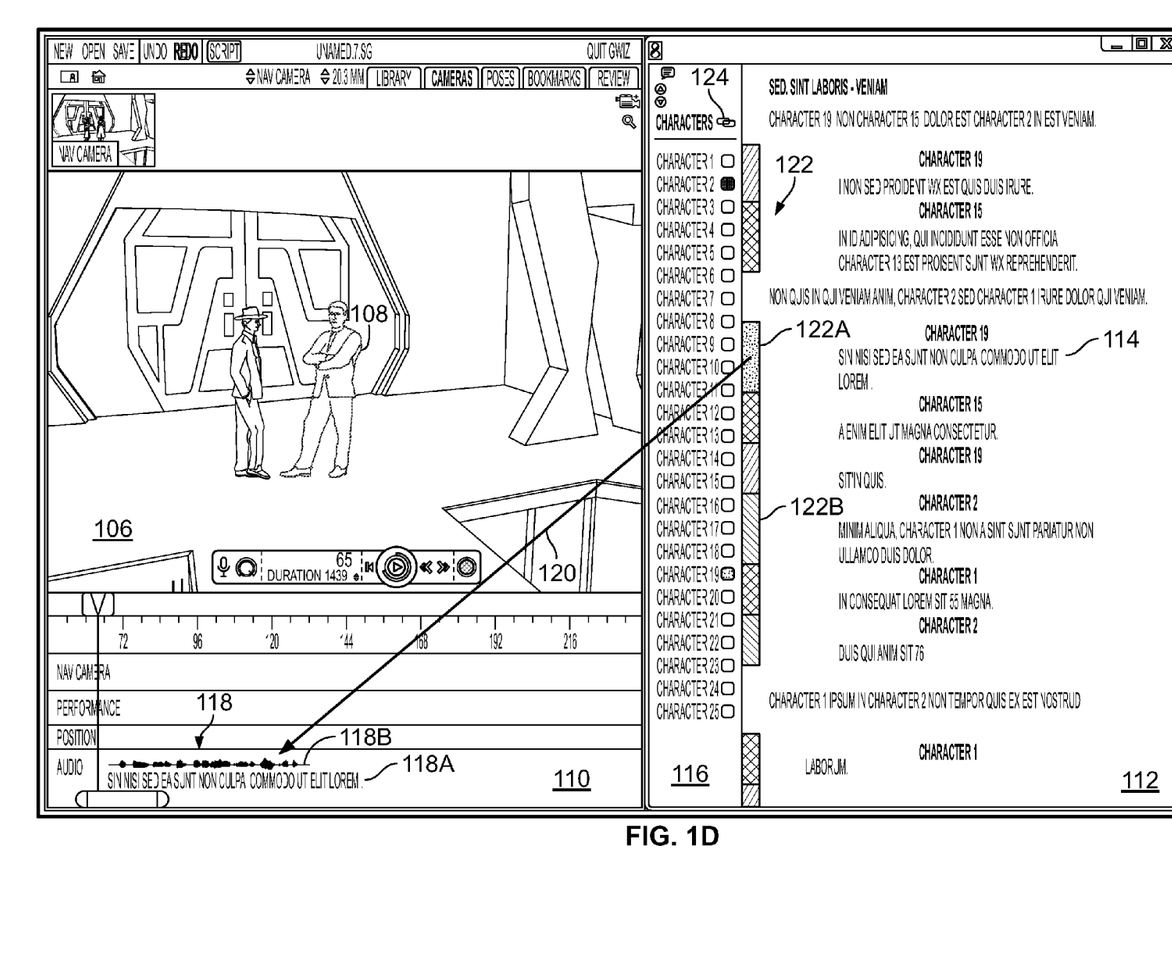

FIG. 1D shows an example of how the 3D animation area 106 can appear after assignment of one or more script lines to the timeline; e.g., whether the assignment was done to the 3D animation area 106 (FIG. 1C) or to the timeline area 110 (FIG. 1B). A timeline object 118 has been created in the timeline as a result of the assignment of the script line, as schematically illustrated by an arrow 120. The timeline object 118 is assigned to a particular point in time in the duration of the 3D animation, the time for example being specified in minutes and/or seconds from the beginning. That is, the corresponding script line is assigned to start playing at that point in time. The object 114 remains in the script area 112 also after being assigned to the timeline area 110, optionally with some visual update as will be described shortly.

The timeline object 118 presents text 118A that corresponds to the script line represented by the object 114. This helps the user see the direct relationship between what is presented in the 3D animation area 106 and the line(s) to be spoken at that time. The timeline object 118 also presents an audio waveform 118B corresponding to the audio data associated with the dialogue line. The audio waveform 118B indicates that this script line has audio associated with it (e.g., meaning that the user can play the recording to hear the line being spoken). To some extent, the audio waveform 118B also reflects the dynamics of this particular recording (e.g., by amplitude), for example to indicate whether the dialogue is being whispered or shouted.

The script area 112 has markings 122 associated with the lines in the script. For example, a marker 122A can correspond to the object 114, and so on for the other objects representing the remainder of the dialogue. The markers 122 can visually indicate one or more characteristics about the corresponding line(s) to the user. First, each of the markers 122 can indicate whether the corresponding object has been assigned to the timeline area 110. For example, the marker 122A here has a solid color or shade indicating that it has been assigned. Another marker 122B, in contrast, here has a hatched color or shade to indicate that it has not been assigned. That is, before the assignment the marker 122A may have been hatched, rather than solid. Any suitable visual indication can be used; for example, the marker(s) for the assigned object(s) can be highlighted or distinguished in another way.

Second, the markers 122 can be part of a coding scheme that provides a uniform representation between the script area 112 and the 3D animation area 106. In some implementations, each script character in the list 116 can be assigned to a corresponding one of the animation characters 108. This assignment determines which of the animation characters 108 is the one "speaking" the lines of the particular script character. Such assignments can be established in any of multiple ways. First, the name of the script character can be compared to the names of the animation characters 108; if there is only one match, the system can associate that animation character with the particular script character. Second, as an alternative or in addition to a name matching approach, a user can force the assignment for one or more characters. In some implementations, the user can click on (or otherwise select) a button 124 to force an association. For example, the user can select the animation character 108; select one of the script characters in the list 116; and click the button 124, which causes the system to register the association.

A specific color or shade can be assigned to the associated characters to visually indicate their relation and to distinguish them from other characters (whether or not those other characters currently have an association). For example, a red color can be assigned to each of: the marker 122A, the entry in the list 116 for the corresponding script character, and the object 118 in the timeline.

In some implementations, a scheme such as the following can be used for the markers 122:

| Color Coding | Significance |
|---|---|
| No line or color | Not dialogue |
| Faint gray hash | Dialogue unassociated with any character; not assigned to timeline |

-continued

| Color Coding | Significance |
| --- | --- |
| Faint gray solid | Dialogue unassociated with any character; assigned to timeline |
| Colored hash | Dialogue associated with a character; not assigned to timeline |
| Color solid | Dialogue associated with a character; assigned to timeline |

Figure 1E:
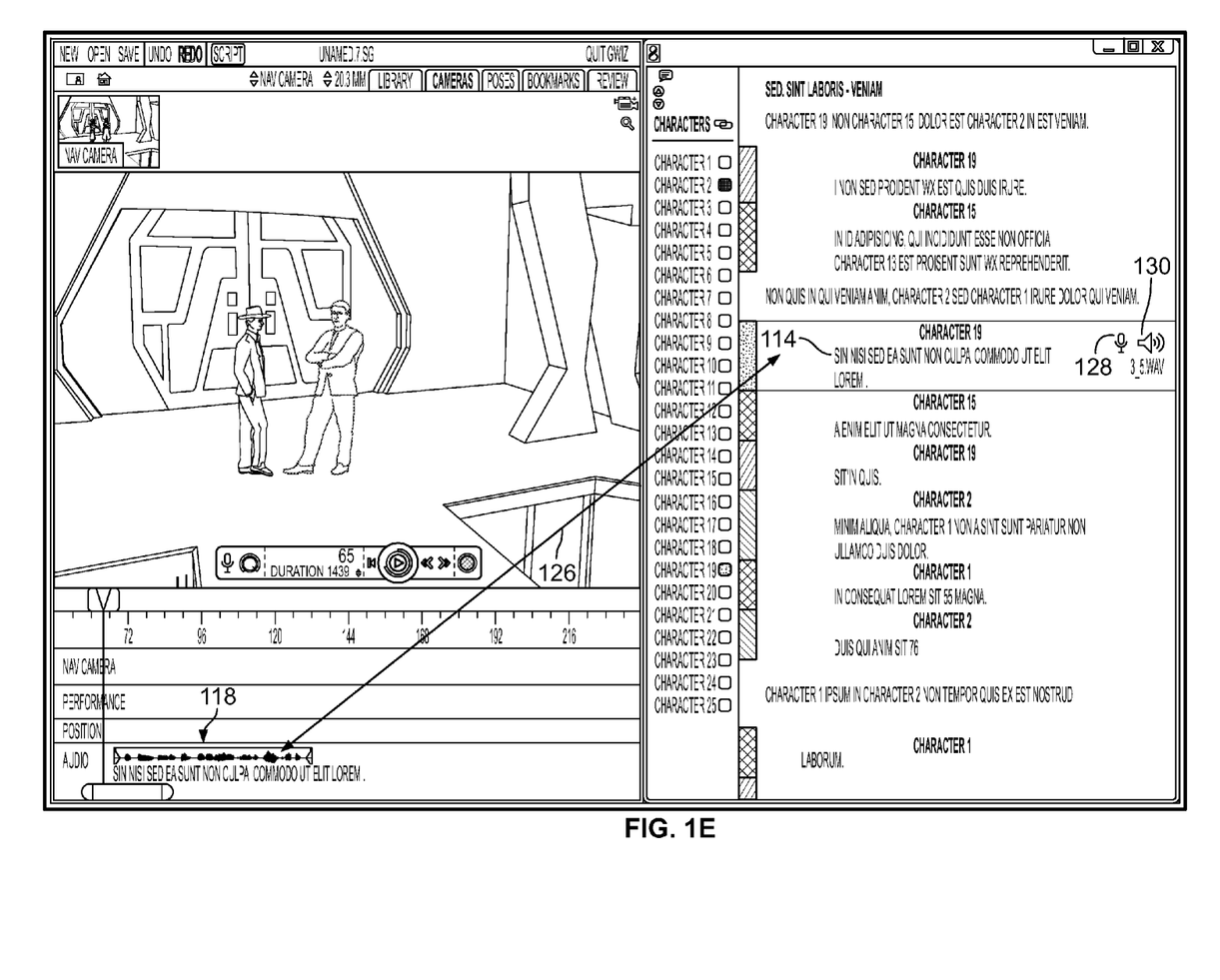

In addition to a coding scheme, or as an alternative thereto, the association between the object 114 and the timeline object 118 can be indicated in other ways. For example, when the user clicks on (or otherwise selects or highlights) one of these two objects, the other one can automatically be indicated. FIG. 1E shows the timeline object 118 and the object 114 schematically connected by a double headed arrow 126. The arrow 126 indicates that selection of the timeline object 118 causes the object 114 to be selected, and vice versa. This helps the user get oriented in the timeline and/or the script.

The object 114 has a button 128 or other input control that allows the user to record a reading of the line. In some implementations, the user clicks on the button 128 for a particular object (i.e., for one or more script lines) to initiate a recording function to generate an audio file to be assigned with the line(s). For example, a director or other user who is evaluating an animation with regard to one or more lines of dialogue, clicks the button 128 and reads the line(s) into a microphone. The recording can end by another click on the button 128. The recorded audio is then associated with the corresponding script object. When the script object has been assigned to a place in the timeline and the 3D animation is run, the system plays the associated audio data using an audio player and the user can then evaluate the animation based on hearing the dialogue.

Instead of, or in addition to, recording done by the user, one or more other sources of audio can be used. For example, the text of the dialogue line can be fed into a speech synthesizer to generate speech by an artificial voice. As another example, one or more pre-existing audio files can be imported into the system and assigned to the corresponding object.

A button 130 for the object 114 indicates that audio data exists for this object. In some implementations, the user can click on (or otherwise select) the object to play the corresponding audio.

Figure 2A:
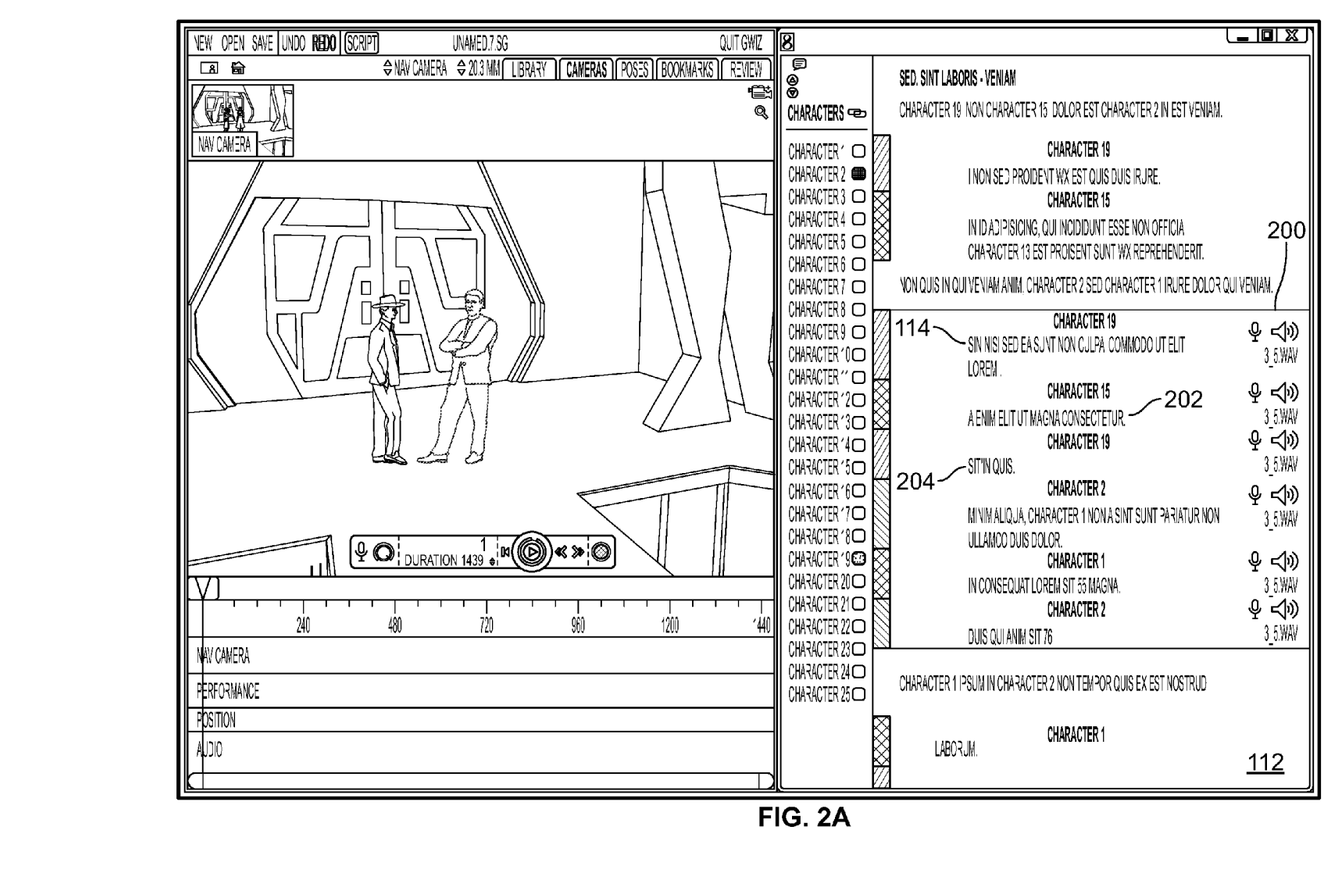
FIGS. 2A-B show another example of interaction between the 3D animation program and the movie script program.

FIGS. 2A-B show another example of interaction between the 3D animation program and the movie script program. In FIG. 2A, the user selects a group 200 of objects in the script area 112. The group 200 includes the object 114 and also other blocks 202, 204, etc. The blocks correspond to dialogue lines that have a particular order in the script. For example, the object 114 is here the first occurring one of the objects in the group 200; the object 202 is the second one, and so on. In analogy with the above examples, the user assigns the group 200 to the timeline (e.g., as in FIG. 1B or C).

Figure 2B:
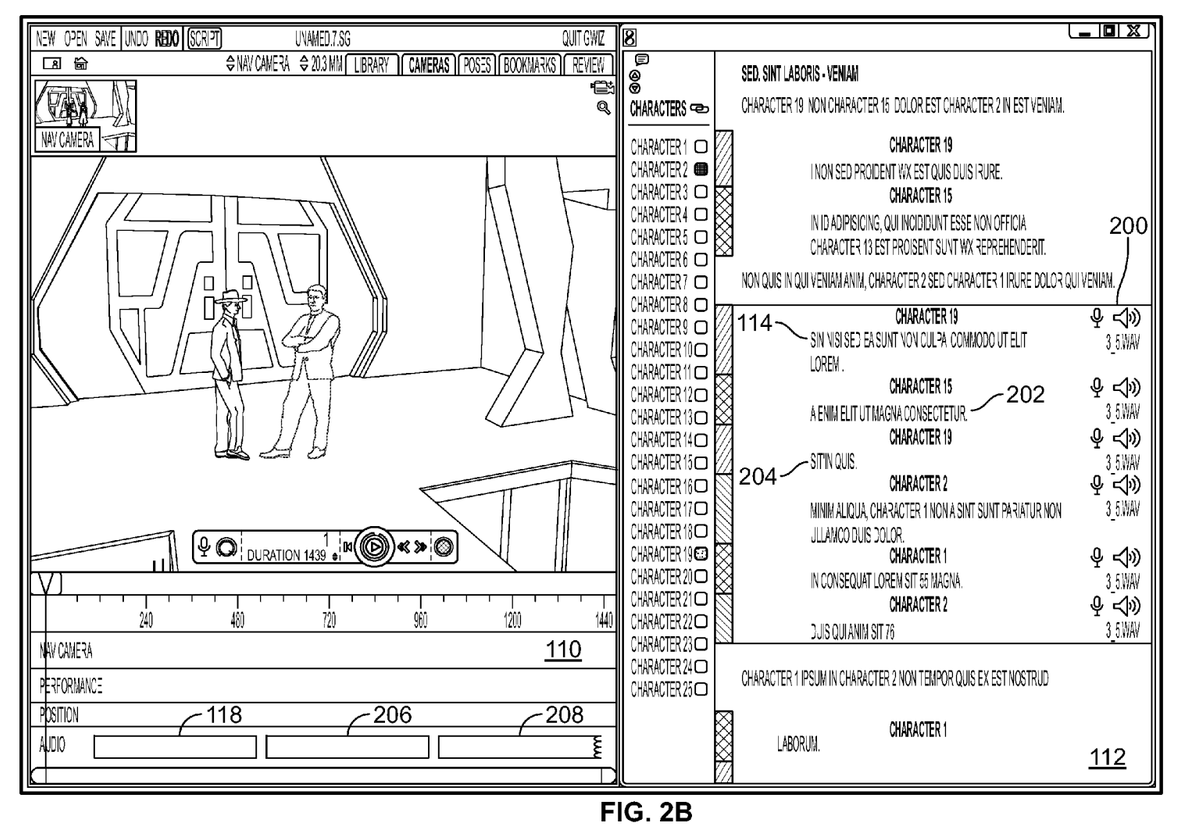

FIG. 2B shows the timeline area 110 after the assignment. Timeline objects have been generated based on the objects in the group 200. Particularly, the timeline object 118 corresponds to the object 114; timeline object 206 corresponds to object 202; timeline object 206 corresponds to object 204; and so on. The timeline objects are sequentially placed according to the order of the corresponding objects in the script area 110. That is, the object 114, which is here the first one of the assigned objects, can have its corresponding timeline object 118 assigned to begin at the point in the timeline to which the group 200 as a whole was assigned. Each of the other timeline objects is placed so that its beginning closely follows the end of the previous timeline object. That is, the other timeline objects are distributed over the timeline area 110 while preserving the order of the group 200. In this example, only some of the timeline objects (114, 206, 208, . . . ) are visible at the same time due to the size of the 3D animation area and to the resolution in the timeline area 110.

Figure 3:
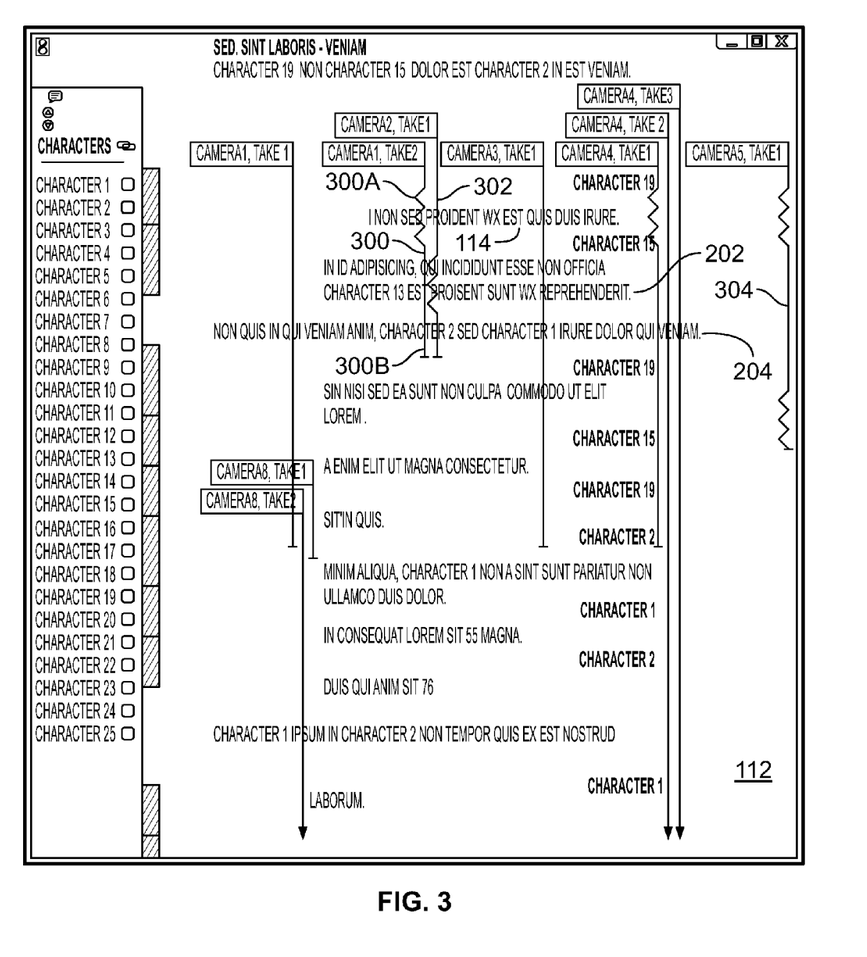
FIG. 3 shows an example of lining-through some of the dialogue lines in the script.

When a 3D animation is recorded using one or more virtual cameras, the script area 112 can be updated to reflect the content of each recorded take. FIG. 3 shows an example of lining-through some of the dialogue lines in the script. Here, the script area 112 has been updated with linear marks (in this example vertical lines) that indicate the various takes. In some implementations, when a recording has been made, the user can update the script area with camera and take identifiers for the recording. For example, with each new recording the system can prompt the user to indicate which script line(s) the recording covers. The user can make such indication in any suitable way, including, but not limited to, by selecting the relevant line(s) in the script area 112 such that the association with the recording is established. For example, the user can select the line(s) in response to the prompt.

Here, a line 300 starts above the object 114 and extends through the object 114 and also the object 202, but does not extend through the object 204 or any other subsequent object. This indicates that dialogue lines corresponding to the objects 114 and 202 are spoken in the take represented by the line 300. That is, the recorded take includes audio from these script lines but not from any other script lines. The spoken dialogue is not necessarily the only audio in the take, however; other audio content such as sound effects and or background noise can also be included.

Similarly, a line 302 indicates another take that encompasses the same script lines as the take for the line 300. In contrast, a line 304 here indicates a longer take than those mentioned above; this take includes the dialogue from the objects 114, 202, 204, and also one or more additional objects. That is, the length of each of the lines 300-304 indicates the scope of the corresponding recorded take.

One or more segments of each line can indicate a characteristic of the corresponding take. For example, in the line 300, a first segment 300A that traverses the object 114 has a saw-tooth shape, whereas a second segment 300B that traverses the object 202 is a straight line. Here, the shape of the segment 300A indicates that the corresponding line of dialogue is spoken off-camera in the take represented by the line 300. By contrast, the shape of the segment 300B indicates that the current take features the corresponding line spoken on-camera. That is, the shapes of the line segments reflect, for each separate take, whether the corresponding animation character can be seen speaking the dialogue line or not. However, with off-camera dialogue lines the animation character is not necessarily absent from the entire take; in some situations an on-camera animation character may exit the camera's field of view before delivering the off-camera dialogue line, and vice versa.

The characteristic(s) for any of the lines 300-304 can be detected in one or more ways. In some implementations, a user who knows what lines are spoken on- or off-camera can input this information in any suitable way. For example, the user makes this indication when the line is first created, or later using an input function associated with the registered line.

Each of the vertical lines (e.g., 300-304 and others) can be marked with information about the corresponding take. For example, the line 300 is marked "camera1, take2", which indicates that the take was recorded using the virtual camera called "camera1", and that this was the second take (i.e., "take2") recorded using that camera. Similarly, the line 302 is labeled "camera2, take1", meaning that this was the first take recorded using another virtual camera called "camera2". Two virtual cameras can differ from each other in terms of their location, orientation and/or movement during the particular scene being recorded. For example, the "camera1" virtual camera is here aimed at the animation character speaking the line for the object 202 (because that line is indicated as being spoken on-camera in the take made using "camera1". By similar reasoning, the "camera2" virtual camera is aimed at the animation character speaking the line for the object 114.

The vertical lines (e.g., 300-304 and others) can be used to trigger playback of the corresponding take. In some implementations, the user clicks on (or otherwise selects) the vertical line to initiate a media player that outputs the corresponding video and audio from the take. For example, the user can click on the camera name or the take name to start the player.

Figure 4:
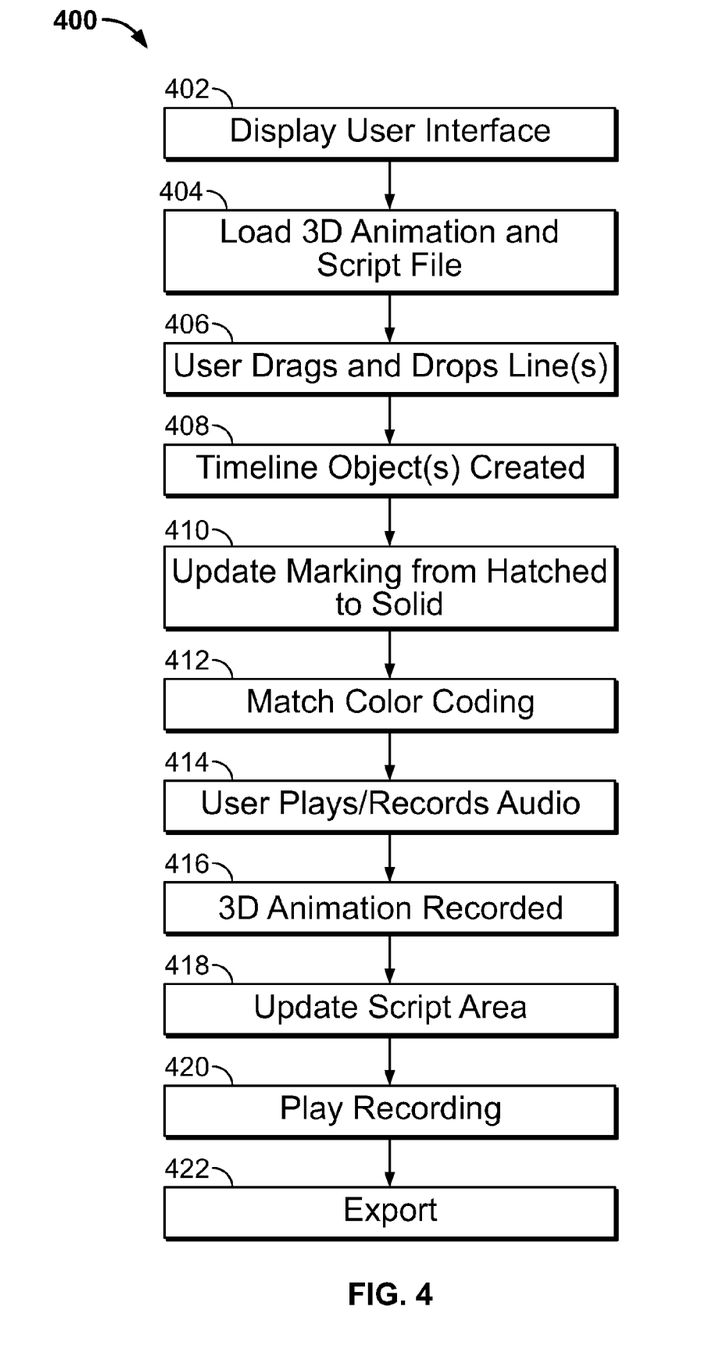
FIG. 4 shows an example flowchart of operations in interaction between a 3D animation program and a movie script program.

FIG. 4 shows an example flowchart of operations 400 in interaction between a 3D animation program and a movie script program. The operations 400 can be performed by one or more processors executing instructions stored in a non-transitory tangible storage medium. In some implementations, two or more of the operations 400 can be performed in a different order. Also, more or fewer operations than in this example can be used.

At 402, a user interface is displayed. For example, FIG. 1A shows the 3D animation program 100 and the movie script program 102 in the user interface 104.

At 404, a 3D animation and a script file are loaded. For example, FIG. 1A shows the 3D animation area 106 generated by the 3D animation program 100, and the script area 112 generated by the movie script program 102.

At 406, the user drags and drops one or more objects from the script. For example, FIGS. 1B-C show the object 114 being dragged and dropped.

At 408, one or more timeline objects are created as a result. For example, FIG. 2B shows the timeline objects 118, 206 and 208.

At 410, the marking of the object(s) is updated. For example, FIG. 1D shows hatched and solid markings.

At 412, a color coding is matched. For example, the script character is matched to the animation character based on matching names or based on the user forcing the match.

At 414, the user plays or records audio. For example, if a particular dialogue line has audio data associated with it, the user can play it by clicking on the object in the script area. If no audio data exists for the dialogue line, or if the user wishes to replace the existing audio, the user can record audio to be associated with the corresponding line.

At 416, a 3D animation is recorded. For example, the user can specify in the timeline area when a particular virtual camera should start and stop recording.

At 418, the script area is updated based on the recording. For example, a camera identifier and/or take identifier can be applied to a visual marking (e.g., a vertical line) that represents the take.

At 420, the recording can be played. For example, the user clicks on the camera name or take number to begin playback. Depending on the animation and on the audio quality, the played recording can give the user a relatively realistic understanding of what the scene could look like if it were filmed at a physical set. Based on viewing the recording, the user may decide to make one or more changes. For example, and without limitation: the virtual environment shown by the 3D animation program can be modified; assets such as things or other items can be added to or removed from the scene; one or more animation characters can be added to or removed from the scene; the location or movement by one or more animation characters in the scene can be modified; the appearance of one or more animation characters in the scene can be modified; the time at which one or more script lines occur in the animation can be adjusted; or the script character can be assigned to another animation character, and vice versa; or the user can change the audio for one or more spoken lines. Any or all such changes, when implemented in the system, can then be played to allow the user an evaluation whether the change should be implemented in the physical system.

At 422, one or more items can be exported. For example, recorded dialogue created using the interface can be collated and exported for use in another package such as a video editing package. Scripts can be exported to commercially available script writing programs. Scripts can also be imported into the system from script files saved from such programs. For example, an EDL file being exported can have the following contents:

```
ZsgFile version 1 text
compound shotAudioClip =
{
    String filePath =
"/san/dept/rnd/projects/zviz/ADdemo/assets/Audio/on_runway3/on_runway3.aif"
    Int offsetFrame = 2
    Int inFrame = 0
    Int outFrame = 167
}
compound shotAudioClip =
{
    String filePath =
"/san/dept/rnd/projects/zviz/ADdemo/assets/Audio/takeoffs/takeoffs.aif"
    Int offsetFrame = 193
    Int inFrame = 0
    Int outFrame = 106
}
compound shotAudioClip =
{
```

-continued

```
        String filePath =
"/san/dept/rnd/projects/zviz/ADdemo/assets/Audio/prop_startup/prop_startup.aif"
        Int offsetFrame = 308
        Int inFrame = 213
        Int outFrame = 368
    }
    compound shotAudioClip =
    {
        String filePath =
"/san/dept/rnd/projects/zviz/ADdemo/assets/Audio/on_runway2/on_runway2.aif"
        Int offsetFrame = 472
        Int inFrame = 287
        Int outFrame = 354
    }
    compound shotAudioClip =
    {
        String filePath =
"/san/dept/rnd/projects/zviz/ADdemo/assets/Audio/on_runway3/on_runway3.aif"
        Int offsetFrame = 547
        Int inFrame = 892
        Int outFrame = 1077
    }
```

Figure 5:
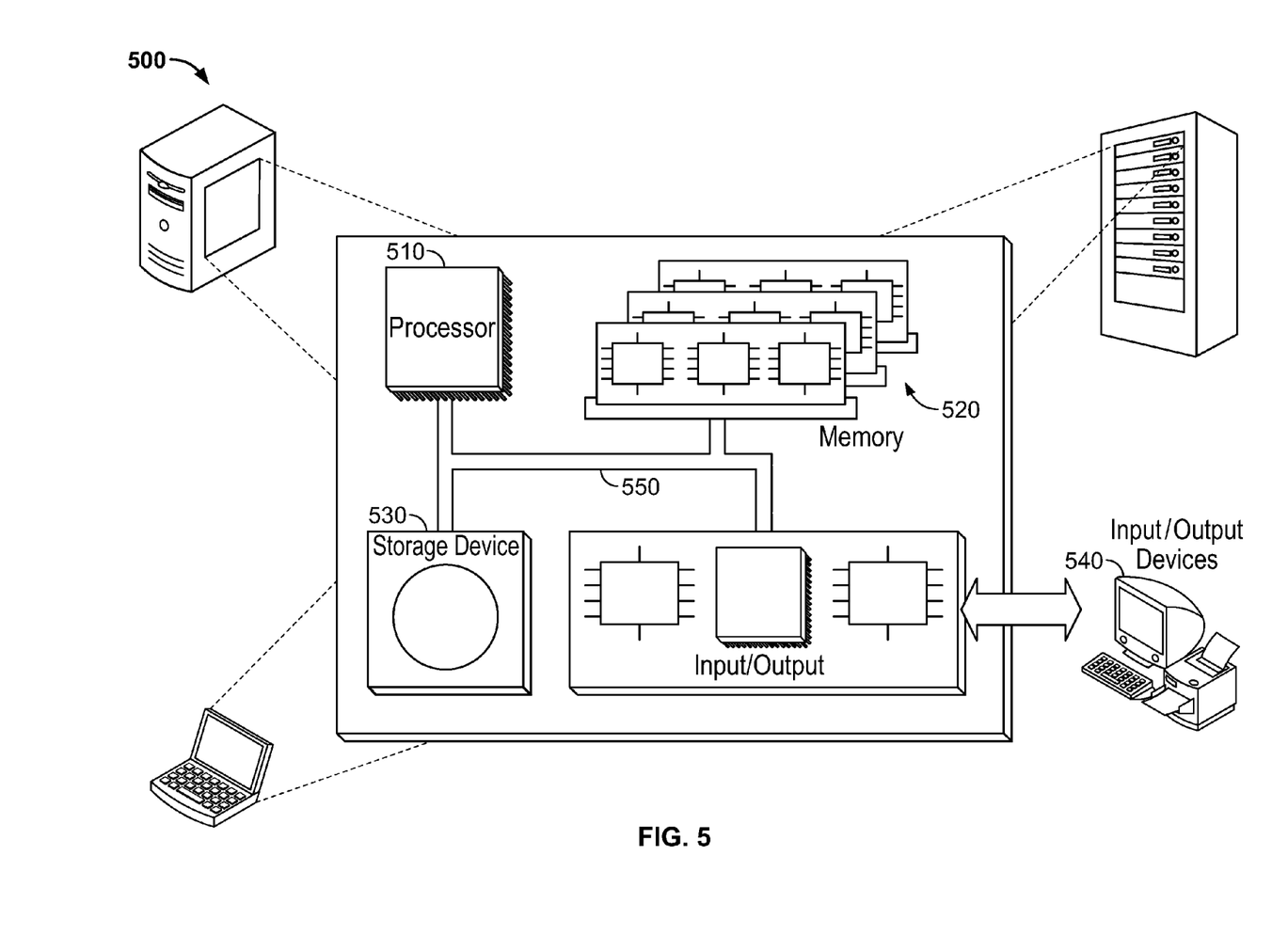
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for interaction between a 3D animation and a corresponding script, the method comprising:
    displaying a user interface that includes at least a 3D animation area and a script area, the 3D animation area including (i) a 3D view area for creating and playing a 3D animation and (ii) a timeline area for visualizing actions by one or more 3D animation characters, the script area comprising one or more objects representing lines from a script having one or more script characters;
    receiving a first user input corresponding to a user selecting at least one of the objects from the script area for assignment to a location in the timeline area and placing the selected object in the 3D viewing area:
    identifying the location in the timeline area as corresponding to a current state of the 3D view area and placing the selected object at the location in the timeline area based on the identification;
    generating a timeline object at the location in response to the first user input, the timeline object corresponding to the selected object; and
    associating audio data with the generated timeline object, the audio data corresponding to a line represented by the selected object.

2. The computer-implemented method of claim 1, wherein the user selects more than one of the objects in the script area, the selected objects having an order specified by the script, the method further comprising:
    generating timeline objects corresponding to the respective selected objects; and positioning the timeline objects in the timeline area according to the order.

3. The computer-implemented method of claim 1, wherein the user hovers the selected object over the timeline area before the assignment, and wherein the location in the timeline area is determined based on where in the timeline area the user places the selected object.

4. The computer-implemented method of claim 1, further comprising updating, in response to the assignment of the selected object to the location in the timeline area, at least the script area to visually distinguish the selected object from any of the objects that have not been assigned to the timeline area.

5. The computer-implemented method of claim 1, wherein the timeline object shows (i) dialogue text corresponding to the line represented by the selected object, and (ii) an audio waveform corresponding to the audio data.

6. The computer-implemented method of claim 1, further comprising making a recording of the 3D animation, and updating at least the script area to include camera and take identifiers for the recording.

7. The computer-implemented method of claim 6, further comprising updating, in response to the recording, the script area with a linear mark indicating at least one of the lines as being included in the recording.

8. The computer-implemented method of claim 6, further comprising receiving a second user input upon the user selecting the camera identifier or the take identifier, and playing the recording in response to the second user input.

9. The computer-implemented method of claim 1, further comprising:
    generating an audio file by recording a reading of the line represented by the selected object; and
    associating the audio file with the object before the first user input is received, wherein the audio data is obtained from the audio file for association with the generated timeline object.

10. The computer-implemented method of claim 9, wherein audio files have been generated for multiple ones of the lines, the method further comprising collating and exporting the audio files.

11. The computer-implemented method of claim 1, further comprising:
    receiving a second user input after generating the timeline object, the second user input selecting one of the timeline object and the object from the script area; and
    highlighting, based on the second user input, the other of the timeline object and the object.

12. A computer implemented method for interaction between a 3D animation and a corresponding script, the method comprising:
    displaying a user interface that includes at least a 3D animation area and a script area, the 3D animation area including (i) a 3D view area for creating and playing a 3D animation and (ii) a timeline area for visualizing actions by one or more 3D animation characters, the script area comprising one or more objects representing lines from a script having one or more script characters;
    receiving a first user input corresponding to a user selecting at least one of the objects from the script area for assignment to a location in the timeline area, wherein the line or lines represented by the selected object belong to a specific script character;
    associating the specific script character with one of the 3D animation characters; color coding, based on the association, the specific script character and the 3D animation character using a common color;
    generating a timeline object at the location in response to the first user input, the timeline object corresponding to the selected object; and
    associating audio data with the generated timeline object, the audio data corresponding to a line represented by the selected object.

13. The computer-implemented method of claim 12, further comprising comparing a name of the 3D animation character with the specific script character, wherein the association is based on the comparison.

14. The computer-implemented method of claim 12, further comprising receiving a second user input that indicates the specific script character and a name of the 3D animation character, wherein the association is based on the second user input.

15. The computer-implemented method of claim 12, wherein the color coding is present at least: (i) in a script character list; and (ii) in a marking adjacent the selected object in the script area.

16. A non-transitory computer-readable storage medium comprising instructions that when executed by a processor perform a method for interaction between a 3D animation and a corresponding script, the method comprising:

displaying a user interface that includes at least a 3D animation area and a script area, the 3D animation area including (i) a 3D view area for creating and playing a 3D animation and (ii) a timeline area for visualizing actions by one or more 3D animation characters, the script area comprising one or more objects representing lines from a script having one or more script characters;

receiving a first user input corresponding to a user selecting at least one of the objects from the script area for assignment to a location in the timeline area and placing the selected object in the 3D viewing area;

identifying the location in the timeline area as corresponding to a current state of the 3D view area and placing the selected object at the location in the timeline area based on the identification;

generating a timeline object at the location in response to the first user input, the timeline object corresponding to the selected object; and associating audio data with the generated timeline object, the audio data corresponding to a line represented by the selected object.

17. The non-transitory computer-readable storage medium set forth in claim 16 wherein when the user selects more than one of the objects in the script area, the selected objects having an order specified by the script, the method performed further comprises:

generating timeline objects corresponding to the respective selected objects; and positioning the timeline objects in the timeline area according to the order.

18. A non-transitory computer-readable storage medium comprising instructions that when executed by a processor perform a method for interaction between a 3D animation and a corresponding script, the method comprising:

displaying a user interface that includes at least a 3D animation area and a script area, the 3D animation area including (i) a 3D view area for creating and playing a 3D animation and (ii) a timeline area for visualizing actions by one or more 3D animation characters, the script area comprising one or more objects representing lines from a script having one or more script characters;

receiving a first user input corresponding to a user selecting at least one of the objects from the script area for assignment to a location in the timeline area, wherein the line or lines represented by the selected object belong to a specific script character;

associating the specific script character with one of the 3D animation characters; color coding, based on the association, the specific script character and the 3D animation character using a common color;

generating a timeline object at the location in response to the first user input, the timeline object corresponding to the selected object; and associating audio data with the generated timeline object, the audio data corresponding to a line represented by the selected object.

19. The non-transitory computer-readable storage medium set forth in claim 18 wherein the method performed further comprises comparing a name of the 3D animation character with the specific script character, wherein the association is based on the comparison.

20. A system comprising:
a display;
a computer-readable storage device having a computer program stored thereon;
one or more processing devices operable to execute the computer program, interact with the display and perform operations comprising:

displaying a user interface that includes at least a 3D animation area and a script area, the 3D animation area including (i) a 3D view area for creating and playing a 3D animation and (ii) a timeline area for visualizing actions by one or more 3D animation characters, the script area comprising one or more objects representing lines from a script having one or more script characters;

receiving a first user input corresponding to a user selecting at least one of the objects from the script area for assignment to a location in the timeline area and placing the selected object in the 3D viewing area;

identifying the location in the timeline area as corresponding to a current state of the 3D view area and placing the selected object at the location in the timeline area based on the identification;

generating a timeline object at the location in response to the first user input, the timeline object corresponding to the selected object; and associating audio data with the generated timeline object, the audio data corresponding to a line represented by the selected object.

21. The system set forth in claim 20 wherein when the user selects more than one of the objects in the script area, the selected objects having an order specified by the script, the operations performed further comprise:

generating timeline objects corresponding to the respective selected objects; and positioning the timeline objects in the timeline area according to the order.

22. A system comprising:
a display;
a computer-readable storage device having a computer program stored thereon;
one or more processing devices operable to execute the computer program, interact with the display and perform operations comprising:

displaying a user interface that includes at least a 3D animation area and a script area, the 3D animation area including (i) a 3D view area for creating and playing a 3D animation and (ii) a timeline area for visualizing actions by one or more 3D animation characters, the script area comprising one or more objects representing lines from a script having one or more script characters;

receiving a first user input corresponding to a user selecting at least one of the objects from the script area for assignment to a location in the timeline area, wherein the line or lines represented by the selected object belong to a specific script character;

associating the specific script character with one of the 3D animation characters; color coding, based on the association, the specific script character and the 3D animation character using a common color;

generating a timeline object at the location in response to the first user input, the timeline object corresponding to the selected object; and associating audio data with the generated timeline object, the audio data corresponding to a line represented by the selected object.

23. The system set forth in claim 22 wherein the operations performed further comprise comparing a name of the 3D animation character with the specific script character, wherein the association is based on the comparison.

* * * * *